United States Patent [19]

Shira

[11] 3,786,171

[45] Jan. 15, 1974

[54] INTEGRAL HINGED WIRING RACEWAY

[75] Inventor: Jerry P. Shira, Toronto, Ontario, Canada

[73] Assignee: Kyoda Plastics Limited, Mississauga, Ontario, Canada

[22] Filed: Jan. 22, 1973

[21] Appl. No.: 325,936

[52] U.S. Cl.................. 174/48, 138/108, 138/115, 138/156, 174/72 C, 174/97
[51] Int. Cl............................................. H02g 3/04
[58] Field of Search.................... 174/48, 49, 68 C, 174/70 C, 72 C, 95, 97, 101; 52/220, 221; 138/108, 111, 115, 116, 117, 156, 157; 339/22 R, 23

[56] References Cited
UNITED STATES PATENTS

| | | | |
|---|---|---|---|
| 3,262,083 | 7/1966 | Gooding | 174/101 X |
| 3,721,762 | 3/1973 | Gooding | 174/48 |

FOREIGN PATENTS OR APPLICATIONS

| | | | |
|---|---|---|---|
| 401,591 | 7/1969 | Australia | 174/49 |
| 1,305,181 | 8/1962 | France | 174/97 |
| 1,470,097 | 1/1967 | France | 174/48 |
| 216,521 | 10/1967 | Sweden | 174/48 |
| 135,210 | 1/1961 | U.S.S.R. | 174/97 |
| 141,284 | 9/1961 | U.S.S.R. | 52/220 |

*Primary Examiner*—Laramie E. Askin
*Attorney*—Rogers, Bereskin & Parr

[57] ABSTRACT

A surface mounting electrical wiring raceway having a back member adapted to be mounted on a wall, and a front cover. The front cover is hingeably connected to the back member adjacent to one lateral edge thereof, and releaseably coupled to the back member adjacent to the opposite lateral edge. The raceway is of single unit construction and requires no alignment if installed adjacent to a floor or ceiling.

7 Claims, 7 Drawing Figures

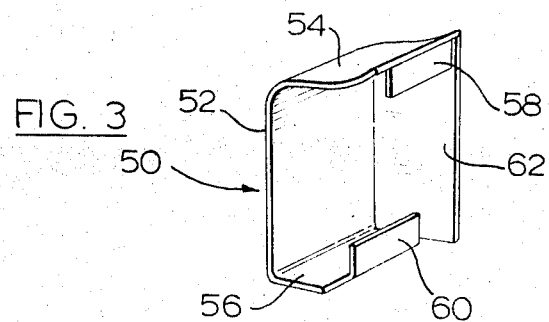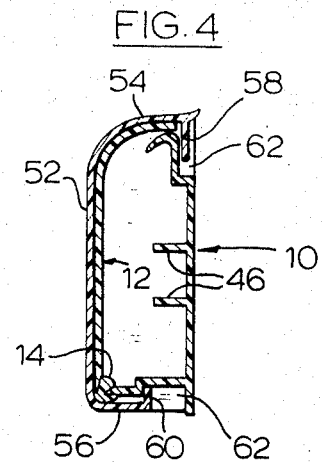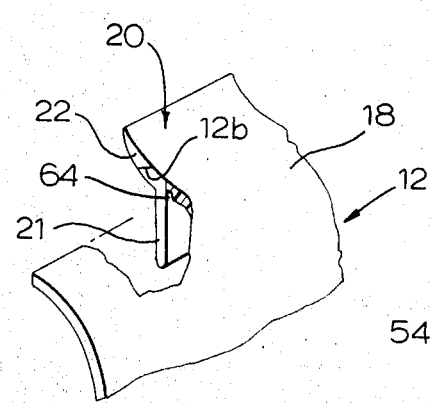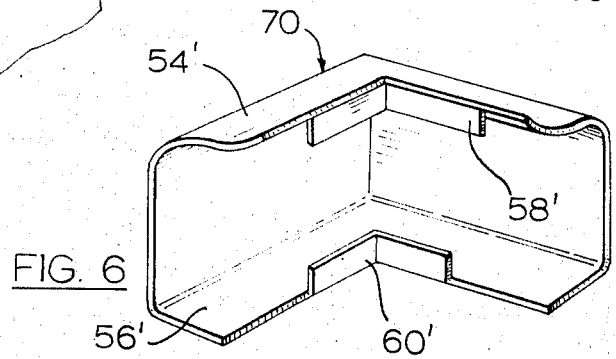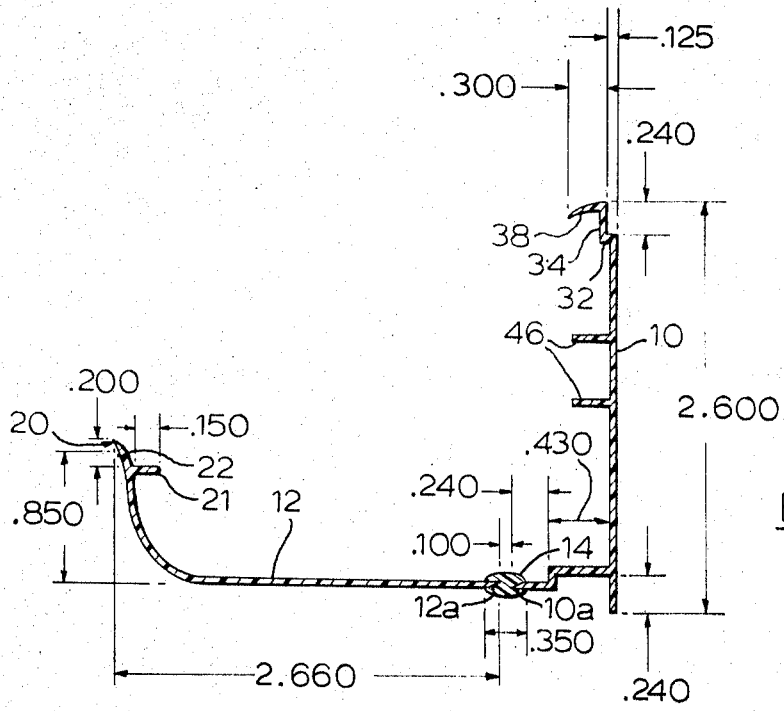
FIG. 3
FIG. 4
FIG. 5
FIG. 6
FIG. 7

INTEGRAL HINGED WIRING RACEWAY

This invention relates to a surface mounted electrical wiring raceway for buildings, and more particularly to a raceway for enclosing wires which run between electrical outlets.

Electrical wiring raceways which may be mounted on the surface of a wall are well known. These raceways are usually made of plastic and may be extruded to form a decorative shape. Prior art raceways have the disadvantage that they usually have a number of parts which must be cut to size, assembled, and aligned with each other and with the wall, ceiling or floor on which the raceway is mounted. This procedure can be time consuming and costly, particularly in view of the high present cost of labour.

It is an object of the present invention to provide a one-piece hinged wiring raceway. It is another object of this invention to provide a raceway which requires no alignment on installation if the raceway is installed adjacent to a floor or ceiling.

Further objects and advantages of the invention will appear from the following disclosure, taken together with the accompanying drawings, in which:

FIG. 3 is a perspective view of an end cap for the raceway of FIGS. 1 and 2;

FIG. 4 is a sectional view showing the end cap in position on the raceway of FIGS. 1 and 2;

FIG. 5 is a perspective view showing how part of the raceway cover is cut away to receive the end cap of FIG. 3;

FIG. 6 is a perspective view showing a corner member for the raceway of FIGS. 1 and 2; and FIG. 7 is a sectional view showing typical dimensions for the raceway.

Figure 1:
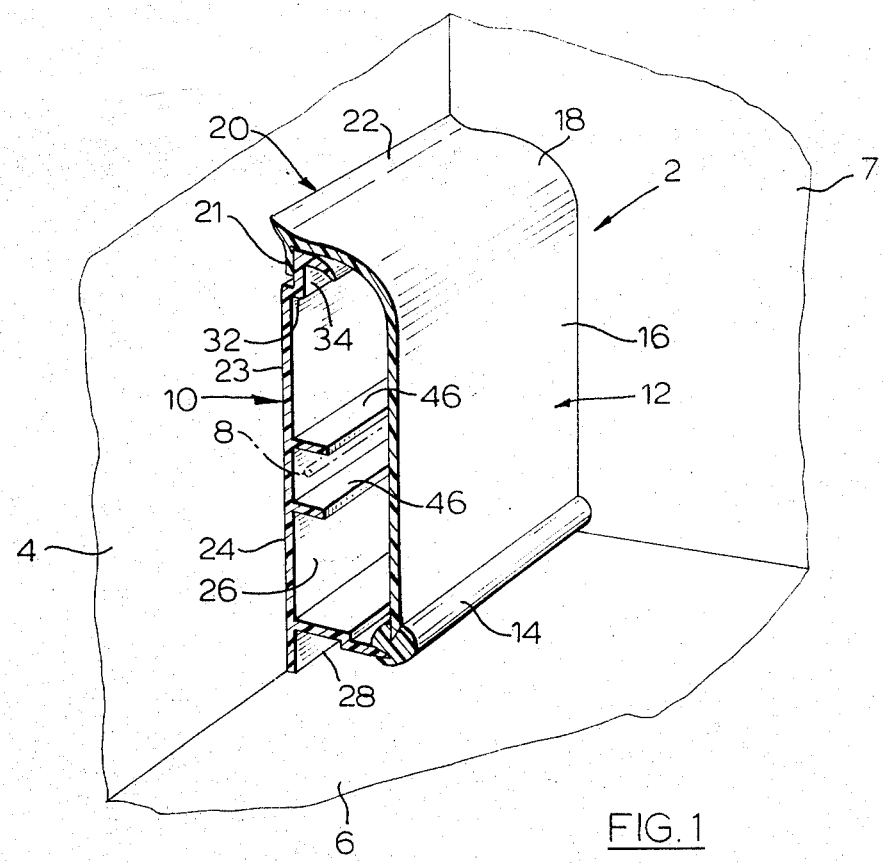
FIG. 1 is a perspective view of an electrical wiring raceway according to the present invention showing the raceway installed on a wall adjacent to a floor and in a closed condition.
Figure 2:
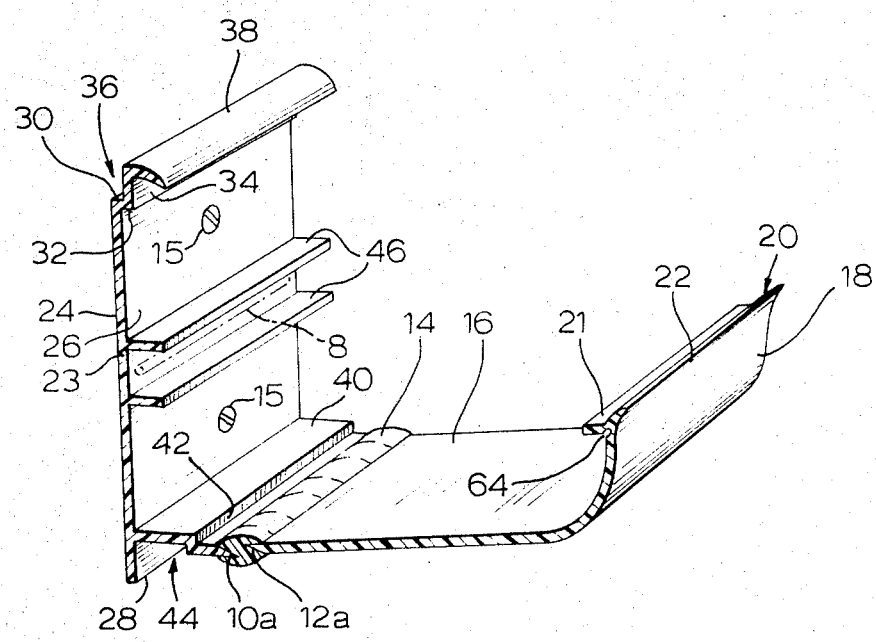
FIG. 2 is a perspective view showing the raceway of FIG. 1 in an open condition.

Reference is first made to FIGS. 1 and 2, which show a section of electrical wiring raceway generally indicated at 2. The raceway 2 is shown attached to a wall 4 and adjacent to a floor 6 in the position normally occupied by a base board. Raceway 2 is shown to extend from an end wall 7, but the raceway may extend from an electrical outlet box or other source of electrical wiring as desired. Electrical wires are shown in dotted lines at 8 as running along the inside of the raceway 2. Typically, when the raceway 2 extends from an electrical outlet box, it will abut against the side of the outlet box, and the wires 8 will enter the outlet box through its side.

Raceway 2 includes a back member 10, a front cover 12, and a flexible bead member 14 which connects the back member 10 to the front cover 12. The back member 10 and front cover 12 are preferably made from extruded relatively rigid plastic. The bead member 14 is preferably extruded from highly flexible plastic, and the three members are joined by any desired means.

Typically the back member 10 and front cover 12 are made from rigid polyvinyl chloride (PVC) sold by BF Goodrich Canada Limited under its no. "Geon 8700A". This is a relatively rigid PVC but does possess some flexibility, for a purpose to be explained. Its Rockwell Hardness "R" is 107R and its Durometer Hardness "D" is 78±3 (both according to ASTM-D-785). The flexible bead member 14 is typically made from a flexible (plasticised) PVC sold by BF Goodrich Canada Limited under its no. "Geon D6510." This material has a Durometer hardness of 65. Other types of PVC may also be used, and in fact suitable plastics other than PVC may be used, but PVC is preferred since it is widely accepted for electrical use.

The three members 10, 12, 14 are preferably all extruded together, through a single orifice, by the process commercially known as dual durometer extrusion. In this process separate feeds are used to feed the rigid and flexible molten PVC to the orifice, and the two materials meld together during the molding and emerge as a single integral unit. Although the three members 10, 12, 14 are shown in the drawing as discrete units separated by lines, such lines are almost indetectable in the finished raceway since the three parts are integrally fused together. In order to provide a substantial area of adhesion between the bead member 14 and the members 10, 12, the edges of the members 10, 12 that are sealed to the bead member are bevelled as indicated at 10a, 12a.

The raceway is mounted by securing the back member 10 to the wall 4 or to any surface on which the raceway is to be mounted. The attachment can be by any convenient means, such as screws, nails, staples, or adhesive. In FIG. 1, the raceway 2 is shown in its closed configuration, and in FIG. 2 the raceway is shown as open with screws 15 holding it to the wall. When the raceway 2 is in its open configuration, wires may be removed, added, or repaired as desired.

The parts of the raceway will now be described in more detail. Firstly, it will be seen that the front cover 12 includes a generally flat face member 16 and a rounded lateral flange member 18 joined thereto. The flange member 18 includes a longitudinal upwardly sloping tapered flange 20 and a longitudinal web 21 adjacent to the flange 20. The tip of the flange 20 is formed by a strip of flexible material 22 of the same composition as bead member 14, so as to form a good seal against a surface on which the raceway is mounted. The strip 22 is dual extruded with the rest of the raceway and hence forms an integral part of the cover 12. Again, the abutting edges of the strip 22 and the remainder of the cover 12 may be bevelled, as indicated at 12b (FIG. 5).

The back member 10 includes a back portion 23 having a flat rear surface 24, a front surface 26, a bottom longitudinal edge 28 and a top longitudinal edge 30. The rear surface 24 overlies the wall or other surface along which it is desired to run electrical wires, while the bottom edge 28 normally rests against the floor, thus aligning the raceway accurately with the floor. The back member 10 further includes a longitudinal lip 32 which extends forwardly from the front surface 26 adjacent to the top edge 30. The lip 32 carries a retaining member 34 which extends upwardly from the forward edge of the lip 32, in a plane parallel to that of the back portion 23. When the back member 10 is mounted on the wall 4, the retaining member 34 defines with the wall an upwardly opening channel 36 adjacent the top edge 30. A longitudinal curved guide strip 38 is connected to the top of the retaining member 34 and slopes forwardly and downwardly toward the front cover 12.

The back member 10 further includes a longitudinal foot 40 spaced above and parallel to the bottom edge 28 and projecting forwardly and horizontally from the front surface 26. The foot 40 is spaced from the bottom edge 28 by a sufficient distance to allow an end cap or corner member to be inserted thereunder, as will be described presently.

The foot 40 includes a downwardly stepped portion 42 which defines with the bottom part of the front surface 26 a downwardly opening channel 44. The channel 44 is used to accommodate the bottom flange of an end or corner cap, as will be described presently.

As indicated, the front cover 12 pivots about the longitudinal axis of the flexible bead member 14. When it is desired to close the raceway 2, the front cover 12 is pivoted towards the back member 10 until the web 21 comes into contact with the guide strip 38. As the front cover 12 is forced to pivot closer to the back member 10, the front cover 12 deflects elastically allowing the web 21 to travel over guide strip 38, until web 21 snaps into channel 36. At this point, the front cover 12 is coupled to the back member 10 so that the raceway 2 will hold wires 8 in position. It should be noted that when the raceway 2 is in this closed configuration, the flexible strip 22 of flange 20 presses lightly against the wall 4 to provide a neat appearance for the raceway 2, and also to prevent dirt from entering raceway 2.

To open the raceway 2 to gain access to the wiring therein, it is only necessary to deflect the flange member 18 away from the back member 10. This removes web 21 from channel 36 allowing the front cover 12 to be uncoupled and pivoted away from the back member 10.

In some cases the raceway may be used to carry both power and communication (e.g. telephone) wires, and such wires should be spaced apart to prevent electrical coupling between them. For this purpose the raceway 2 is provided with a pair of optional flanges 46 which are spaced apart vertically and which extend forwardly from the back portion 23. Power wires can be stapled between the flanges 46 and communication wires can be secured above or below the flanges 46, or vice versa, to ensure proper separation of the two types of wires.

It will be appreciated that means other than the web 21 and channel 36 may be used for connecting the front cover 12 to the back member 10. Any suitable releaseable coupling means could be used which would allow the front cover 12 to be uncoupled and pivoted away from back member 10. However, the web 21 and channel 36 connecting means is preferred because it is very simple.

Although only a short section of raceway 2 is shown in FIGS. 1 to 3, the extruded construction permits the raceway 2 to be made in a desired length. If desired, the plastic forming the front cover 12 could be coloured in order to eliminate the need to paint the raceway. Also, the profile of the front cover 12 may be easily changed if it is desired to make the raceway 12 resemble a more decorative moulding.

If the raceway is to terminate in the middle of a wall or other surface, then an end cap becomes necessary, and a suitable end cap is shown at 50 in FIG. 3. The end cap is simply a generally C-shaped member, having a face portion 52 and inwardly extending top and bottom portions 54, 56. Flanges 58, 60 project downwardly and upwardly respectively from the inner edges of the top and bottom portions 54, 56, and an end plate 62 closes one end of the end cap.

The end cap 50 is typically molded as a one-piece plastic (PVC) unit and is made of size such that it will fit over the closed raceway 2 with the flange 60 of the end cap projecting upwardly into the channel 44 and seated against the foot 40 (FIG. 4). The top flange 58 of the end cap must fit into the channel 36 at the top of the raceway and for this purpose those parts of the web 21 and flange 20 which would interfere with the flange 60 are removed. To facilitate such removal, the cover 12 is grooved at 64, on the inside surface of the rounded flange 18 just where the latter meets the web 21, so that the required portion of the web 21 and flange 20 can be removed. The groove 64 is preferably formed during extrusion of the cover 12. FIG. 5 shows the cover 12 with an appropriate portion of the web 21 and flange 20 removed.

Where the raceway extends around corners, corner members 70 (FIG. 6) are used. The corner members are identical with the end caps 50, except that they are L-shaped to extend around corners and they lack the end plates 62 which close the end caps. Primed reference numerals are therefore used in FIG. 6 to indicate parts corresponding with those of FIGS. 3 and 4.

Typical dimensions for the preferred embodiment of the raceway are given in FIG. 7. All wall thicknesses in FIG. 7 are 0.045 inches, and all dimensions shown in the drawing are inches. It will be noted that the upper channel 36 is kept very narrow (typically .125 inches) to facilitate sealing it against dust and dirt, while the lower channel 44 is quite wide (typically .430 inches) so that the bottom of the end caps and corner members will require less material.

What I claim is:

1. A surface mounted hinged wiring raceway comprising:
   an elongated back member including:
   1 an elongated thin back portion having a flat back surface adapted to be mounted against a wall, a front surface, and first and second opposed longitudinal edges, said first longitudinal edge being adapted to abut against a surface transverse to said wall thus to align said raceway with such surface,
   2 an elongated longitudinal lip extending forwardly from said front surface adjacent said second longitudinal edge,
   3 an elongated retaining portion extending from said lip in a direction away from said first edge and located in a plane substantially parallel to that of said back surface, said retaining portion being spaced forwardly of said rear surface of said back member whereby to define with said wall against which said back surface lies a longitudinal first channel opening in a direction away from said first edge, said retaining portion having an edge remote from said lip and having at such edge a longitudinal guide portion sloping in a direction forwardly and towards said first edge,
   4 a longitudinal foot extending forwardly from said front surface of said back portion, said foot being spaced from said first edge towards said second edge by a predetermined distance, said foot having a longitudinal stepped portion spaced forwardly of said front surface, said stepped portion defining with said front surface a longitudinal second channel opening in a direction away from said second edge, said stepped portion including a second longitudinal lip extending forwardly from said channel, b an elongated front cover having a first longitudinal edge, c an elongated flexible bead member sealed permanently to said second longitudinal lip and to said first longitudinal edge of said front cover so that said front cover and said back member form a single integral unit and so that said front cover may pivot relative to said back member about said bead member, d said front cover including an elongated web portion extending in a direction towards said first edge of said front cover, said web portion being adapted to slide over said guide portion of said back member and to snap into said first channel when said cover is pivoted about said bead member to carry said web portion towards said guide portion, e said front cover including an elongated tapered flange protruding beyond said web member and sloping in a direction away from said first edge of said front cover, said elongated tapered flange being adapted to press against said wall when said cover is closed whereby to seal said first channel against entry of dust and dirt therein.

2. A raceway according to claim 1 wherein said back member and said front cover are formed of rigid polyvinyl chloride and said bead member is formed of flexible polyvinyl chloride, said back member, front cover and bead member all being extruded together.

3. A raceway according to claim 2 wherein said front cover has an elongated groove in its inner surface, said groove being located adjacent said web and located on the side of said web towards said first edge of said front cover, whereby to facilitate removal of a portion of said web to allow placement of an end cap or corner member over said front cover.

4. A raceway according to claim 3 wherein said predetermined distance is substantially 0.25 inches.

5. A raceway according to claim 1 wherein the edge of said elongated flange is formed of a flexible material sealed permanently to the remainder of said front cover, whereby said elongated flange may yield as it presses against said wall.

6. A raceway according to claim 1 wherein the width of said second channel in a front to rear direction is substantially greater than that of said first channel.

7. A raceway according to claim 1 and including a pair of spaced flange members projecting forwardly from said front surface of said back portion and forming separating means for wires in said raceway.

* * * * *